United States Patent
Reiter

(10) Patent No.: US 11,325,307 B2
(45) Date of Patent: May 10, 2022

(54) METHOD FOR SOLIDIFYING A PHOTOPOLYMERIZABLE, DIFFUSELY REFLECTING MATERIAL

(71) Applicant: Lithoz GmbH, Vienna (AT)

(72) Inventor: Rafael Reiter, Vienna (AT)

(73) Assignee: LITHOZ GMBH, Vienna (AT)

( * ) Notice: Subject to any disclaimer, the term of this patent is extended or adjusted under 35 U.S.C. 154(b) by 313 days.

(21) Appl. No.: 16/326,311

(22) PCT Filed: Aug. 30, 2017

(86) PCT No.: PCT/AT2017/000059
§ 371 (c)(1),
(2) Date: Feb. 18, 2019

(87) PCT Pub. No.: WO2018/039688
PCT Pub. Date: Mar. 8, 2018

(65) Prior Publication Data
US 2020/0269504 A1 Aug. 27, 2020

(30) Foreign Application Priority Data

Aug. 30, 2016 (EP) .................................. 16450022

(51) Int. Cl.
*B29C 64/255* (2017.01)
*B33Y 10/00* (2015.01)
(Continued)

(52) U.S. Cl.
CPC .......... *B29C 64/255* (2017.08); *B29C 64/135* (2017.08); *B33Y 10/00* (2014.12); *B33Y 30/00* (2014.12)

(58) Field of Classification Search
None
See application file for complete search history.

(56) References Cited

U.S. PATENT DOCUMENTS

2018/0079029 A1* 3/2018 Scott ...................... B23K 26/04
2019/0224918 A1* 7/2019 Zheng ..................... B29C 67/00
(Continued)

FOREIGN PATENT DOCUMENTS

GB  2477828 A  8/2011
WO  2015128783 A1  9/2015

OTHER PUBLICATIONS

International Search Report for PCT/AT2017/000059, dated Jul. 11, 2017, 14 pages.

*Primary Examiner* — Yung-Sheng M Tsui
(74) *Attorney, Agent, or Firm* — Liang & Hennessey LLP; Brian Hennessey

(57) ABSTRACT

In a method for solidifying a photopolymerizable, diffusely reflecting material by irradiation, wherein the material coats a transparent material confining element, such as a material support or a tank bottom, and the irradiation of a surface to be solidified is performed through the transparent material confining element into the material, a) the thickness of the material confining element and b) the coated surface and/or the construction field and/or the surface to be solidified of the material are adapted to one another such that the thickness of the material confining element is at least ¼, preferably at least ⅓, preferably at least ½, of the diameter of the coated surface, or the surface to be solidified, or the construction field, respectively.

23 Claims, 5 Drawing Sheets

(51) Int. Cl.
*B33Y 30/00* (2015.01)
*B29C 64/135* (2017.01)

(56) References Cited

U.S. PATENT DOCUMENTS

2020/0032062 A1* 1/2020 Wallin .................... C08L 83/04
2020/0282650 A1* 9/2020 Houbertz .............. B29C 64/273

* cited by examiner

METHOD FOR SOLIDIFYING A PHOTOPOLYMERIZABLE, DIFFUSELY REFLECTING MATERIAL

CROSS-REFERENCE TO RELATED APPLICATIONS

This application is a national phase application of PCT Application No. PCT/AT2017/000059, filed Aug. 30, 2017, entitled "METHOD FOR SOLIDIFYING A PHOTOPOLYMERIZABLE, DIFFUSELY REFLECTING MATERIAL", which claims the benefit of European Patent Application No. 16450022.5, filed Aug. 30, 2016, each of which is incorporated by reference in its entirety.

FIELD OF THE INVENTION

The invention relates to a method for solidifying a photopolymerizable, diffusely reflecting material by irradiation, wherein the material coats a transparent material confining element, such as a material support or a tank bottom, and the irradiation of a surface to be solidified is performed through the transparent material confining element into the material, and a device for carrying out such a method.

The invention further relates to a method for the layered construction of a shaped body from a photopolymerizable, diffusely reflecting material, in particular a resin with ceramic or metallic filler, in which shaped body layers are successively formed one above the other by respectively forming on the material confining element a material layer of predefined thickness of the photopolymerizable material, and a construction platform, or the shaped body at least partially built on the construction platform, is lowered into the material layer such that, between the construction platform, or the shaped body, and the tank bottom a layer to be solidified of the material is formed, which is position-selectively solidified by irradiation through the material confining element to provide the desired shape of the shaped body layer.

BACKGROUND

In one of the predominant techniques of additive manufacturing or 3D printing, namely stereolithography, individual layers of a shaped body are cured by position-selective radiation, thus successively producing the desired object in its three-dimensional shape. The photopolymerizable starting material can be made up of different components. The method mentioned in the beginning uses a diffusely reflecting material as it is used for the additive manufacturing of ceramic shaped bodies. Such a ceramic-filled material is a suspension of components with different refraction indices. This leads to the diffusion or redistribution of the light introduced for curing the material, and hence to an attenuation of contrast and a number of errors that would not occur in unfilled transparent starting materials.

The initially mentioned method is, in particular, concerned with the situation that the photopolymerizable material is exposed through a transparent material confining element that is directly coated by the material. The material confining element usually forms part of a tank containing the photopolymerizable material used in the process, the material confining element thus having to be mechanically stable. In other methods, the material confining element just comprises a thin film or foil or is composed of several components having different elastic and optical properties.

A possible application of the method or device of the initially defined kind is described in WO 2010/045950 A1 and in EP 2505341 A1. The methods described there serve for the layered construction of a shaped body by applying lithography-based generative manufacturing, e.g. rapid prototyping. Therein, a defined layer of a photopolymerizable material provided in a tank with a transparent tank bottom, i.e. material confining element, is formed in the following manner. A vertically controlledly movable construction platform is carried by a lifting mechanism and disposed on the tank so as to be vertically liftable and lowerable by the lifting mechanism under the control of a control unit. By lowering the construction platform into the photopolymerizable material provided in the tank, material is forced out of the space between the lower side of the construction platform and the tank bottom, thus producing a material layer of defined thickness. That layer is subsequently irradiated by position selective radiation from below through the transparent tank bottom to thereby cure the layer in the desired geometry on the construction platform. After this, the construction platform with the first layer cured thereon is lifted, and photopolymerizable material is newly fed into the exposed region. These steps are repeated in order to build up the shaped body of consecutive layers, wherein, however, the layer of photopolymerizable material will thus be defined by the unfinished shaped body rather than the construction platform.

As pointed out above, the photopolymerizable material is generally provided in a tank or vat, which is equipped with a transparent material confining element coated by the material. Said material confining element is solidified by the position-selective irradiation of a layer. The optical properties of the optical path reaching beyond the light source and its projection system as well as the optical and photochemical properties of the photopolymerizable material usually prevent the geometry of the solidified layer from corresponding to the geometry of the real image created by the projector. The projection of geometrically correct digital image data thus results in the fabrication of shaped bodies with imperfect geometries.

The components contained in the photopolymerizable material may exhibit different optical properties. The relevant effect of the present invention is a difference in the refraction indices of the transparent components. Light refraction occurs on every interface between two materials having different refraction indices. The components are usually in suspension, i.e. the size of the droplets or grains is in the µm range, thus forming numerous interfaces. If light rays are refracted by a number of interfaces randomly oriented relative to one another, the light will be redistributed or scattered in all directions. A portion of the light irradiated into the material re-emerges from the material, from its surface, on or near the irradiation point. This effect is called diffuse reflection.

Such diffusely reflected light re-enters the transparent material confining element and is transmitted, normally reflected and/or totally internally reflected in different portions from the bottom and the lateral surface of the material confining element, i.e. the boundary layers between the material confining element and air. Being a solid, the transparent material confining element usually is comprised of a medium with a significantly higher refraction index than air, thus causing light refraction and the cited phenomena. The light is able to return to the material by simple or multiple reflections, which actually constitutes a reduction of the image contrast and leads to significant errors in the layer geometry.

The influence of total internal reflection is particularly high, since the light diffusely reflected by the photopolymerizable material is again reflected back to the material in its full intensity.

Usually occurring errors thus caused comprise magnifications of individual shaped bodies, or individual regions within a shaped body, the close-up of desired cavities or holes in the shaped body and the growing together of shaped bodies to be originally formed separately, in the extreme case over distances of several centimeters.

SUMMARY

The present invention, therefore, aims to improve a method and a device of the initially defined kind to the effect that the occurrence of the above-mentioned errors will be avoided or at least reduced.

To solve this object, a first aspect of the invention in a method of the initially defined kind for solidifying a photopolymerizable, diffusely reflecting material substantially provides that a) the thickness of the material confining element and b) the coated surface and/or the construction field and/or the material surface to be solidified are adapted to one another such that less than 40%, preferably less than 30%, particularly preferably less than 20%, in particular less than 10%, of the radiation reflected from the material into the material confining element, is reflected back into the material, in particular into the construction field, preferably into the surface to be solidified, in the material confining element or on its surfaces.

According to a second aspect of the invention, it is substantially provided, in a method of the initially defined kind for solidifying a photopolymerizable, diffusely reflecting material, that a) the thickness of the material confining element and b) the coated surface and/or the construction field and/or the material surface to be solidified are adapted to one another that the thickness of the material confining element is at least ¼, preferably at least ⅓, preferably at least ½, of the diameter of the coated surface, or the surface to be solidified, or the construction field, respectively, in particular in such a manner that less than 40%, preferably less than 30%, particularly preferably less than 20%, in particular less than 10%, of the radiation reflected from the material into the material confining element is reflected back into the material, in particular into the construction field, preferably into the surface to be solidified, in the material confining element or on its surfaces.

The reflections caused within the material confining element, which lower the contrast and negatively affect the irradiation result, are thus reduced to a minimum. In particular, a change in the optical parameters of the optical path is achieved in that the thickness of the material confining element and the coated surface and/or the directly irradiated surface, i.e. the surface to be solidified, of the material are adapted to one another.

In this respect, the invention is based on the following physical contexts. The electromagnetic radiation utilized for solidifying the photopolymerizable material (1st light) enters, at first, the entry surface of the transparent material confining element and, after this, through the opposite exit surface of the material confining element, the material to be solidified, which coats the material confining element. A significant portion thereof (2nd light) is diffusely reflected back from the material into the material confining element. There, a significant portion of the reflected radiation is again returned to the material from the bottom of the material confining element, i.e. the said entry surface, and the lateral or side faces of the material confining element via one or several reflections (3rd light), which, in a conventional arrangement with a material confining element having a relatively small thickness, may amount to about 50% (by total internal reflection) and about 4% (by reflection) of the 2nd light.

A backscattered light ray (2nd light) is normally reflected on the radiation entry surface, if the angle between the interface normal and the ray is smaller than the critical angle $\vartheta c$ resulting from the refraction indices on the interface, i.e. of the material confining element, and air as a rule. By contrast, a backscattered ray (2nd light) is totally internally reflected if the angle between the interface normal and the ray is larger than the critical angle $\vartheta c$ (i.e. the ray rather travels towards the edge of the material confining element), wherein the entire ray is reflected back to the material due to total internal reflection.

In this case, the radius of the circle around the exit point of the diffuse reflection in the material which results from the critical angle as the minimum radius for the return of the totally internally reflected light is referred to as critical radius rc.

The larger the thickness of the material confining element is selected, i.e. the longer the path to be traveled by the totally internally reflected ray, the larger is the critical radius. The larger the critical radius, the smaller the portion of the totally internally reflected rays entering the material coating the material confining element, in particular the material to be solidified.

The portion of the totally internally reflected rays entering the material, however, also depends on the size of the coated surface, or the surface to be solidified/directly irradiated (1st light) surface, of the material. The smaller the coated surface, or the surface to be solidified, of the material is selected, the smaller is the portion of the totally internally reflected radiation reaching the material.

If, in the context of the invention, the thickness of the material confining element and the size of the coated surface are adapted to each other, this is done with a view to reducing the radiation portion totally internally reflected into the coated surface, the coated surface comprising the material surface to be solidified or directly irradiated (1st light). On the other hand, if, in the context of the invention, the thickness of the material confining element and the size of the material surface to be solidified are adapted to each other, this is only done with a view to reducing the radiation portion totally internally reflected into the surface to be solidified such that it will be accepted that the radiation portion totally internally reflected into the coated surface externally surrounding the surface to be solidified is reduced not at all or to a slight extent, as the case may be. Although this does not directly involve an increase in the occurrence of shape formation errors or inaccuracies in the region to be solidified, the radiation totally internally reflected into the material externally surrounding the surface to be solidified, on the one hand, will cause material changes and possible solidifications there, which will be detrimental in subsequent process steps because the thus affected material may then reach the region to be solidified during further material feeding. On the other hand, the radiation totally internally reflected into the surrounding material will again be diffusely reflected there, which may in turn lead to an uncontrolled radiation distribution, inter alia, in the region to be solidified.

A reduction of the (totally internally) reflected radiation to less than 40%, preferably less than 30%, particularly preferably less than 20%, in particular less than 10%, according to a preferred configuration of the method is achieved in that the thickness of the material confining element and the coated surface, in particular the construction field, are adapted to each other such that the radiation reflected from the material into the material confining element and reflected by total internal reflection on the surface facing away from the coated surface, in particular the radiation entry surface, of the material confining element will not be directly reflected back into the coated surface, or the construction field.

It may also be proceeded such that the thickness of the material confining element and the material surface to be solidified are adapted to each other such that the radiation reflected from the material into the material confining element and reflected by total internal reflection on the radiation entry surface facing away from the coated surface, of the material confining element will not be directly reflected back into the material surface to be solidified.

By the term "surface to be solidified", the surface area of a circle the diameter of which connects the points farthest apart of the layer to be solidified is preferably to be understood.

The radiation entry surface in this case is that subsurface of the surface facing away from the coated surface, of the material confining element via which the radiation from an irradiation unit directly enters the material confining element. The exit surface is that subsurface of the coated surface of the material confining element via which the radiation from the material confining element enters the material to be solidified.

By the term "construction field", the maximally possible exit surface predefined by the light source or the irradiation optics is to be understood, i.e. the maximally possible surface on which the shaped body can be formed on the construction platform.

If, due to the material of the material confining element (e.g. glass), it is anticipated that the critical angle from which total internal reflection occurs is 45°, it is provided according to the second aspect of the invention that the thickness of the material confining element is at least ¼, preferably at least ⅓, preferably at least ½, of the diameter of the coated surface, or the surface to be solidified. The selection of a thickness of ½ of the coated surface, at a critical angle of 45°, ensures that from no point of the coated surface a ray of the 2nd light will be totally internally reflected in such a manner that the totally internally reflected ray (3rd light) will directly reach the coated surface. By diameter of the coated surface or surface to be solidified, the distance between the points that are farthest apart from each other, of the surface is understood.

In the context of the invention, the adaptation of the thickness of the material confining element is performed to the effect that, thereby, the path traveled by the rays reflected from the material into the material confining element until impinging on the radiation entry surface facing away from the coated surface will be adjusted. In this respect, the thickness correlates with the path length in such a manner that the path length increases with the thickness of the material confining element increasing, and, vice versa, the path length decreases with the thickness of the material confining element decreasing.

By thickness of the material confining element, the smallest distance between the construction field and the radiation entry surface facing away from the coated surface, of the material confining element is preferably understood.

The smallest distance between the coated surface and the radiation entry surface facing away from the coated surface, of the material confining element is preferably 10 mm, preferably at least 15 mm, preferably at least 20 mm, preferably at least 30 mm, whereas prior art material confining elements have smaller thicknesses.

Another preferred mode of operation provides that the thickness of the material confining element and the coated surface are adapted to each other such that any radiation reflected from the material into the material confining element at the critical angle or more to the interface normal, is totally internally reflected on the side walls of the material confining element, which, in particular, also applies for a ray emanating from a boundary point of the coated surface farthest away from an (opposite) side wall, whereby it is ensured that no ray reflected into the material confining element at the critical angle or more (2nd light) will be totally internally reflected directly into the coated surface (3rd light). At the transition from glass to air, the critical angle is 41°, and at the transition from plexiglass to air it is 42°. By side walls, the boundary surfaces of the material confining element forming neither an exit surface nor an entry surface, in particular the lateral boundary surfaces of the material confining element including neither an entry surface nor an exit surface for the radiation, are herein understood.

It is possible for a ray totally internally reflected into a side wall to again reach the coated surface by further total internal reflection, yet this can be prevented, or at least reduced, according to a preferred mode of operation in that the surface except for the radiation entry and exit surfaces, preferably the side walls, of the material confining element are at least partially provided with radiation-absorbing properties, in particular with a layer that absorbs radiation at least in certain areas. The radiation-absorbing properties in this case refer to the absorption, in the wavelength range, of the radiation used for the irradiation and solidification of the photopolymerizable material.

Furthermore, the occurrence of total internal reflection on the interface can also be reduced in that, as in correspondence with a preferred configuration of the invention, the surface, preferably the radiation entry surface facing away from the coated surface, of the material confining element is at least partially provided with antireflection properties, in particular with an antireflective layer.

The method according to the invention can be used in the context of a method for the layered construction of a shaped body from a photopolymerizable, diffusely reflecting material, in particular a resin with ceramic filler, in which shaped body layers are successively formed one above the other by respectively forming on the material confining element a material layer of predefined thickness of the photopolymerizable material and lowering a construction platform, or the shaped body at least partially built on the construction platform, into the material layer so as to cause a layer to be solidified of the material to form between the construction platform, or the shaped body, and the material confining element, which layer is position-selectively solidified by irradiation through the material confining element to provide the desired shape of the shaped body layer.

To solve the object underlying the invention, it is, moreover, provided according to a third aspect of the invention in a device of the initially defined kind that the thickness of the material confining element and the coatable surface, in particular the construction field, are adapted to each other such that less than 40%, preferably less than 30%, particularly preferably less than 20%, in particular less than 10%, of the radiation reflected from the material into the material confining element, in the material confining element or on its surfaces is reflected back into the material, in particular into the construction field, or the surface to be solidified.

According to a fourth aspect of the invention, it is substantially provided in a device of the initially defined kind that the thickness of the material confining element and the coatable surface, in particular the construction field, are adapted to each other such that the thickness of the material confining element is at least ¼, preferably at least ⅓, preferably at least ½, of the diameter of the coatable surface, in particular the construction field.

The thickness of the material confining element and the coatable surface, in particular the construction field, are preferably adapted to each other such that the radiation reflected from the material into the material confining element and reflected by total internal reflection on the surface facing away from the coatable surface, in particular the radiation entry surface of the material confining element, are not directly reflected back into the coatable surface, in particular into the construction field.

The smallest distance between the construction field and the radiation entry surface facing away from the coatable surface is preferably at least 10 mm, preferably at least 15 mm, preferably at least 20 mm, preferably at least 30 mm.

Advantageously, the thickness of the material confining element and the coatable surface are adapted to each other such that the radiation reflected from the material into the material confining element at the critical angle or more is totally internally reflected on the side walls of the material confining element.

The surface except for the radiation entry and exit surfaces, preferably the side walls, of the material confining element are preferably at least partially provided with radiation-absorbing properties, in particular with a layer that absorbs radiation at least in certain areas.

It is preferably provided that the surface, preferably the radiation entry surface facing away from the coatable surface, of the material confining element is at least partially provided with antireflection properties, in particular with an antireflective layer.

In order to facilitate the removal of the solidified material layer, the material confining element comprises an elastic layer forming the coatable surface. Depending on the respective configuration, said layer may have a thickness of a few 100 µm to some millimeters.

In a preferred manner, the material confining element comprises a transparent block of glass or polymethylacrylate (acrylic glass).

According to a further aspect of the invention, the latter comprises a device for the layered construction of a shaped body from a photopolymerizable material, in particular a resin with ceramic filler, comprising:

a material confining element, in particular a tank with a bottom translucent at least in some areas, into which photopolymerizable material can be filled, a doctor blade held above the material confining element, in particular at an adjustable height, for the formation of a material layer on the material confining element, wherein an adjustment unit is provided for adjusting said height, a construction platform held at an adjustable height above the material confining element, an irradiation unit actuatable for the position-selective irradiation of a shaped body layer formed between the lower side of the construction platform, or the partially completed shaped body, and the material confining element, an electronic memory for a virtual, three-dimensional model of the shaped body layers and the shaped body built thereof, a control unit, to which the virtual model of the shaped body layers is supplied and which is configured to polymerize in consecutive irradiation steps superimposed shaped body layers on the construction platform each with a predefined geometry by controlling the irradiation unit, wherein the device comprises the characteristic features of the solidification device according to the invention.

BRIEF DESCRIPTION OF THE DRAWINGS

In the following, the invention will be explained in more detail by way of exemplary embodiments schematically illustrated in the drawing. Therein.

DETAILED DESCRIPTION

Figure 1:
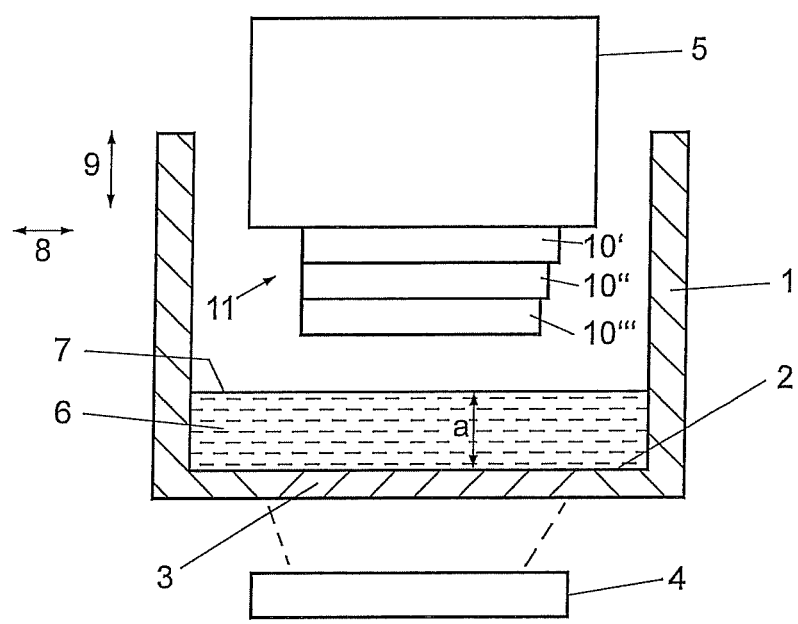
FIGS. 1 to 3 are sectional views of a device for the layered construction of a shaped body in consecutive phases of the method course.

At first, the mode of functioning of a device for implementing a method according to the present invention is described with reference to FIGS. 1 to 3, which illustrate a device already known per se from EP 2505341 A1. The device, which is located in air or any other gas atmosphere, comprises a tank 1 whose tank bottom 2 is transparent or translucent at least in a partial region 3.

This partial region 3 of the tank bottom at least covers the extension of an irradiation unit 4 disposed below the tank bottom 2. The irradiation unit 4 comprises a light source (not illustrated) and a light modulator with the aid of which the intensity can be controlled, and position selectively adjusted, by a control unit in order to generate on the tank bottom 2 a exposure field having the geometry desired for the layer to be formed at the moment. Alternatively, a laser may be used in the irradiation unit, the light ray of which laser successively scans the exposure field with the desired intensity pattern via a movable mirror controlled by a control unit.

Opposite the irradiation unit 4, a construction platform 5 is provided above the tank 1, which is carried by a lifting mechanism (not illustrated) so as to be held in a height-adjustable manner above the tank bottom 2, in the region above the irradiation unit 4. The construction platform 5 may also be transparent or translucent.

In the tank 1 is a bath of diffusely reflecting photopolymerizable material 6. The material level 7 of the bath is defined by a suitable element such as a doctor blade, which applies the material uniformly on the tank bottom 2 at a defined material layer thickness a. The tank 1 may, for instance, be associated with a guide rail, on which a carriage is movably guided in the sense of double arrow 8. A drive ensures the reciprocating movement of the carriage, which comprises a mount for a doctor blade. Said mount, for instance, comprises a guide and an adjustment device for vertically adjusting the doctor blade in the sense of double arrow 9. Thus, the distance of the lower edge of the doctor blade from the bottom 2 of the tank 1 can be adjusted. The doctor blade is used when the construction platform is in the lifted state as illustrated in FIG. 1, and serves to uniformly distribute the material 6 upon adjustment of a predefined layer thickness. The layer thickness of the material 6 resulting from the material distribution process is defined by the distance of the lower edge of the doctor blade from the bottom 2 of the tank 1.

Figure 2:
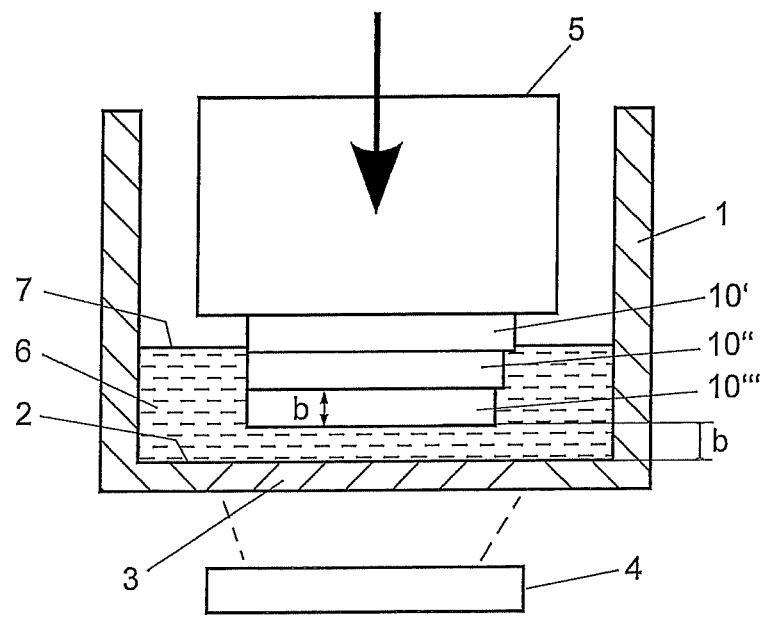
Figure 3:
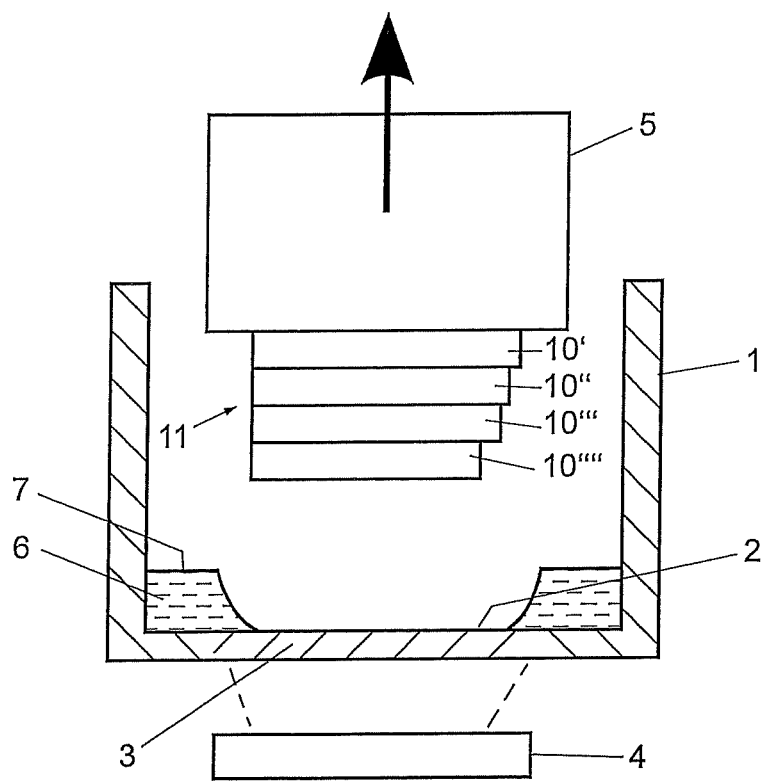

The thus formed material layer thickness a is larger than the layer thickness b of the shaped body (FIG. 2). For defining a layer of photopolymerizable material, it is proceeded in the following manner. The construction platform 5, on which shaped body layers 10', 10", and 10''' have already formed, is lowered by the lifting mechanism in a controlled manner as illustrated in FIG. 2 such that the lower side of the lowermost shaped body layer 10''' initially contacts the surface of the material bath 6 with height a, is then immersed and approaches the tank bottom 2 to such an extent that exactly the desired shaped body layer thickness b will remain between the lower side of the lowermost shaped body layer 10''' and the tank bottom 2. During this immersion process, photopolymerizable material is forced out of the interspace between the lower side of the construction platform 5 and the tank bottom 2. As soon as the shaped body layer thickness b has been adjusted, the position selective irradiation specific for this shaped body layer takes place in order to cure the shaped body layer 10"" in the desired shape. After the formation of the shaped body layer 10"", the construction platform 5 is lifted again by the lifting mechanism, thus providing the condition shown in FIG. 3. The photopolymerizable material 6 is no longer present in the exposed region.

These steps are subsequently repeated several times in order to obtain additional shaped body layers 10 of photopolymerizable material. The distance of the lower side of the last-formed shaped body layer 10 to the tank bottom 2 is adjusted to the desired shaped body layer thickness b and, after this, the photopolymerizable material is position selectively cured in the desired manner.

Figure 4:
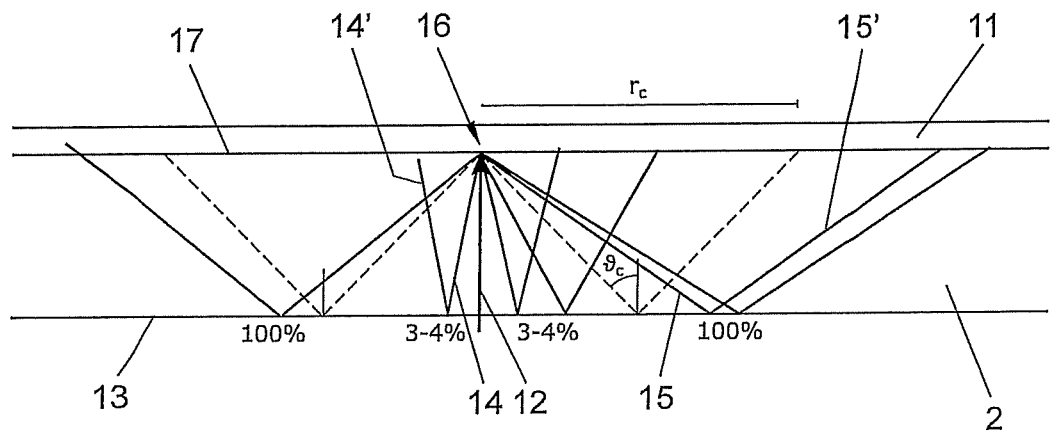
FIG. 4 illustrates the reflection and total internal reflection in the material confining element of light diffusely reflected through the material.

In FIG. 4, the tank bottom 2 as well as the material layer 11 coating the tank bottom 2, and the reflection behavior of the bottom are schematically illustrated. A light ray 12 reaching the surface of the photopolymerizable material from the irradiation unit 4 through transparent tank bottom 2 is diffusely reflected back into the tank bottom 2 by a significant portion. The diffusely reflected light is then again reflected from the interface of the tank bottom 2 to air, i.e. on the radiation entry surface 13. If the incidence angle is larger than the critical angle $\vartheta_c$, total internal reflection will occur. In the case of glass, $\vartheta_c$ is about 45°, thus more than half of the diffusely reflected light is altogether reflected back to the material.

A backscattered light ray can either be normally reflected: the angle between the interface normal and the light ray 14 is smaller than the critical angle $\vartheta_c$ such that a normal reflection occurs and a small portion 14' (a few percent) of the light is reflected back to the material 11; or be totally internally reflected: the angle between the interface normal and the light ray 15 is larger than the critical angle $\vartheta_c$ such that a total internal reflection occurs and the entire light ray 15' is reflected back to the material.

The critical radius rc is the radius of the circle around the exit point 16 of the diffuse reflection in the material 11, which results from the critical angle as the minimum radius for the return of totally internally reflected light.

Figure 5:
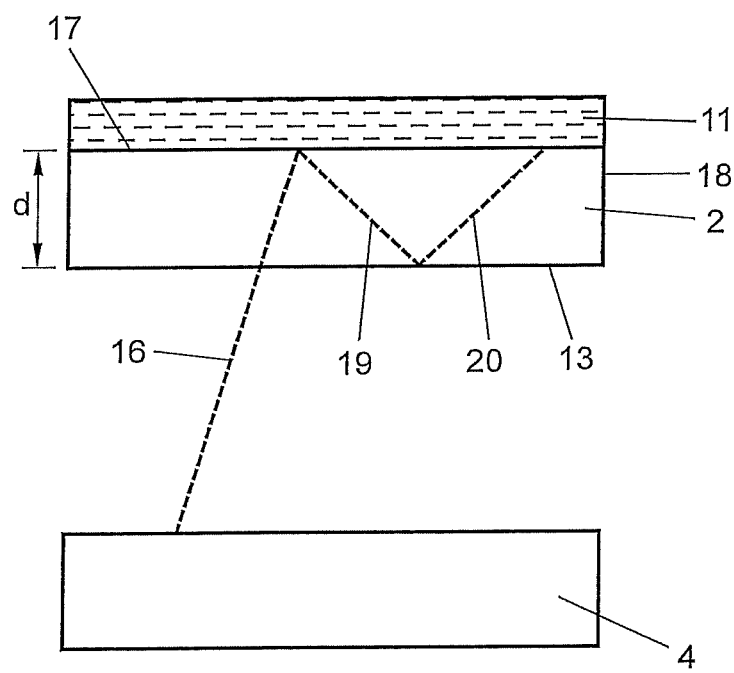
FIG. 5 shows the exemplary path of a light ray emitted from the radiation source, diffusely reflected through the material, totally internally reflected on the radiation entry surface facing away from the coatable surface, of the material confining element, and returning back to the material.

As illustrated in FIG. 5, light 16 is radiated into the photopolymerizable material 11 through the tank bottom 2 (1st light). It initially enters the entry surface 13 of the tank bottom 2 and subsequently passes through the exit surface 17 of the tank bottom 2 into the material layer 11 coating the tank bottom 2. A significant portion thereof is diffusely reflected back from the material into the half-space (2nd light 19), i.e. into the tank bottom 2. A significant portion of the latter is, in turn, brought back to the material from the entry surface 13 and the lateral surface 18 of the bottom 2 via one or several reflections (3rd light 20), this accounting for about 50% (by total internal reflection), and about 4% (by reflection), of the 2nd light 19 with a tank bottom 2 of small thickness.

Figures 8A, 8B, 8C:
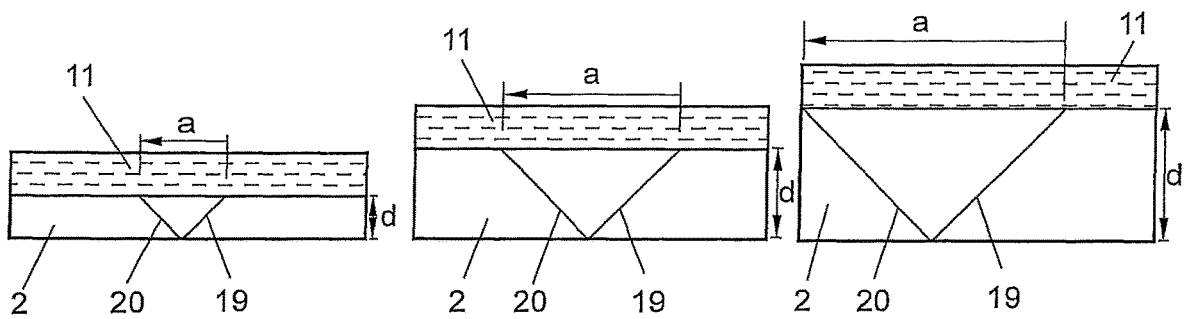
FIGS. 8a-8c illustrate the exemplary paths of a light ray which, due to an increased thickness of the material confining element, is unable to return back to the material by simple total internal reflection after diffuse reflection on the material.

The exposure result is influenced in different ways by total internal reflection at the entry surface 13 of the light diffusely reflected from the material 11 as a function of the thickness d of the tank bottom 2 (FIG. 8):

Small thickness (FIG. 8a): Total internal reflection 20 returns to the material 11 almost completely and with a small reach, i.e. a high intensity per surface area. Objects become slightly larger.

Medium thickness (FIG. 8b): Total internal reflection 20 returns almost completely and with a wide reach, i.e. a low intensity per surface area. Objects grow together even over larger distances, the material is partially polymerized.

High thickness (FIG. 8c): For geometric reasons, total internal reflection 20 does not directly return to exit surface 17, yet can be reflected thereto through the lateral surface 18 of the tank bottom 2.

In general, the totally internally reflected portion is dominant in terms of lateral reach and intensity, but the normally reflected portion may already be sufficient for photopolymerizable material to solidify on the wrong sites.

The intensity of the reflected light approximately decreases quadratically with the thickness of the tank bottom. Moreover, the critical radius increases with the thickness of the tank bottom, i.e. all of the totally internally reflected portion is shifted out of the region of the exit surface 17 at 2d tan $\vartheta_c > r_F$ ($r_F$ being the maximum diagonal of the coatable area).

Thus, the thickness of the tank bottom 2 is preferably selected such that no totally internally reflected light will be able to directly return to the exit surface 17 of the tank bottom 2. In the described case, the totally internally reflected light completely reaches the lateral surface 18 of the tank bottom 2. There, depending on the angle, total internal reflection 21 or reflection occurs anew and may again lead to uncontrolled exposure. If the critical angle is below 45° (which is the case with most glasses), there will be a portion that will be totally internally reflected even by the tank bottom and the lateral surface and will, therefore, return to the material in its full intensity. With the tank thickness increasing, the occurrence of such totally internally reflected light will rise significantly, i.e. less and less light will emerge laterally from the tank.

Figure 6:
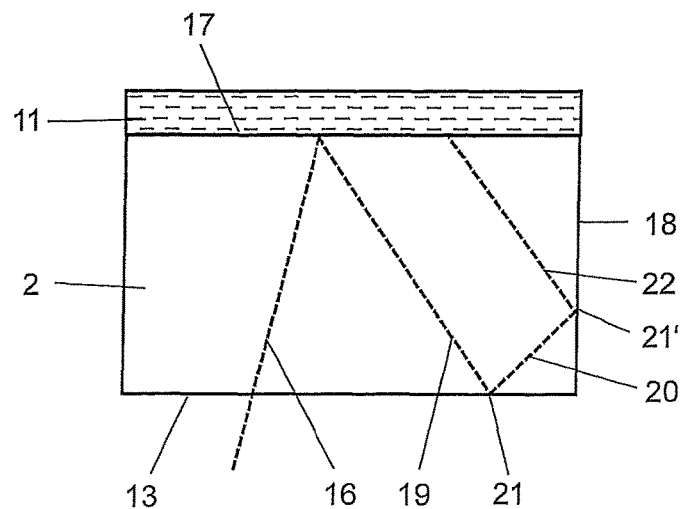
FIG. 6 shows the exemplary path of a light ray returning back to the material by multiple reflections after diffuse reflection.

FIG. 6 depicts such a multiple reflection in more detail. A diffusely reflected light ray is initially reflected at the entry surface 13 and subsequently at the lateral surface 18 of the tank bottom 2. Depending on whether this is a normal reflection or a total internal reflection 21, 21' in each case, the portion reflected back to the material ranges between a few permil and 100 percent.

Figure 7:
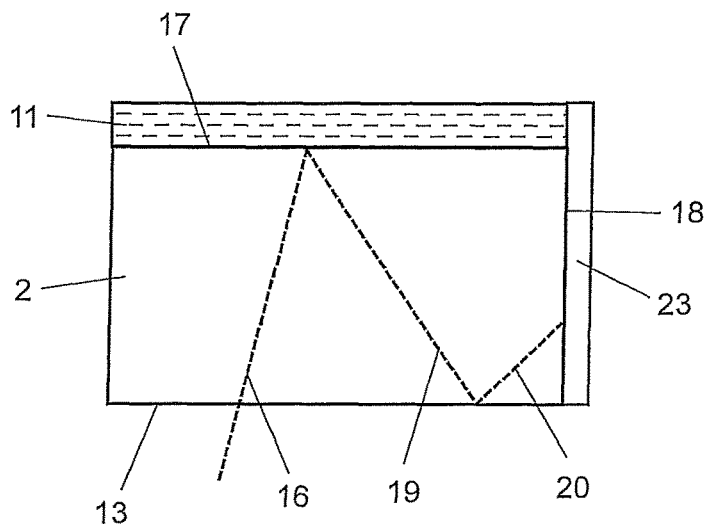
FIG. 7 shows the exemplary path of a light ray which, due to the use of an absorber, is unable to return back to the material by multiple reflections after diffuse reflection.

In order to prevent the above-described reflections on the lateral surfaces 18 of the tank bottom 2, in particular at an increasing bottom thickness, a light-absorbing material 23 is preferably applied to the lateral surfaces 18. This portion increases with an increasing bottom thickness, since the lateral surface 18 becomes larger. FIG. 7 schematically illustrates how the multiple reflection of a light ray is prevented by an absorbing layer 23.

On the tank bottom 2, the light is exclusively reflected normally because of the high bottom thickness. In order to reduce this effect, the tank bottom can be antireflectively coated. The antireflective coating may comprise a classic AR coating or a continuous change of the refraction index (e.g., "moth eye"). Alternatively or additionally, all surfaces of the tank bottom 2 beyond the entry and exit surfaces can be absorptively coated, which will also reduce the (disadvantageous) light exchange with the remaining optical path.

For process-engineering reasons, or in order to enhance maintainability, the tank bottom can be comprised of different transparent components, which are either fixedly (adhesive) or dismountably (oil) connected to one another. Some of the components can be fixedly installed in the machine, and others can be readily removable.

Figure 9:
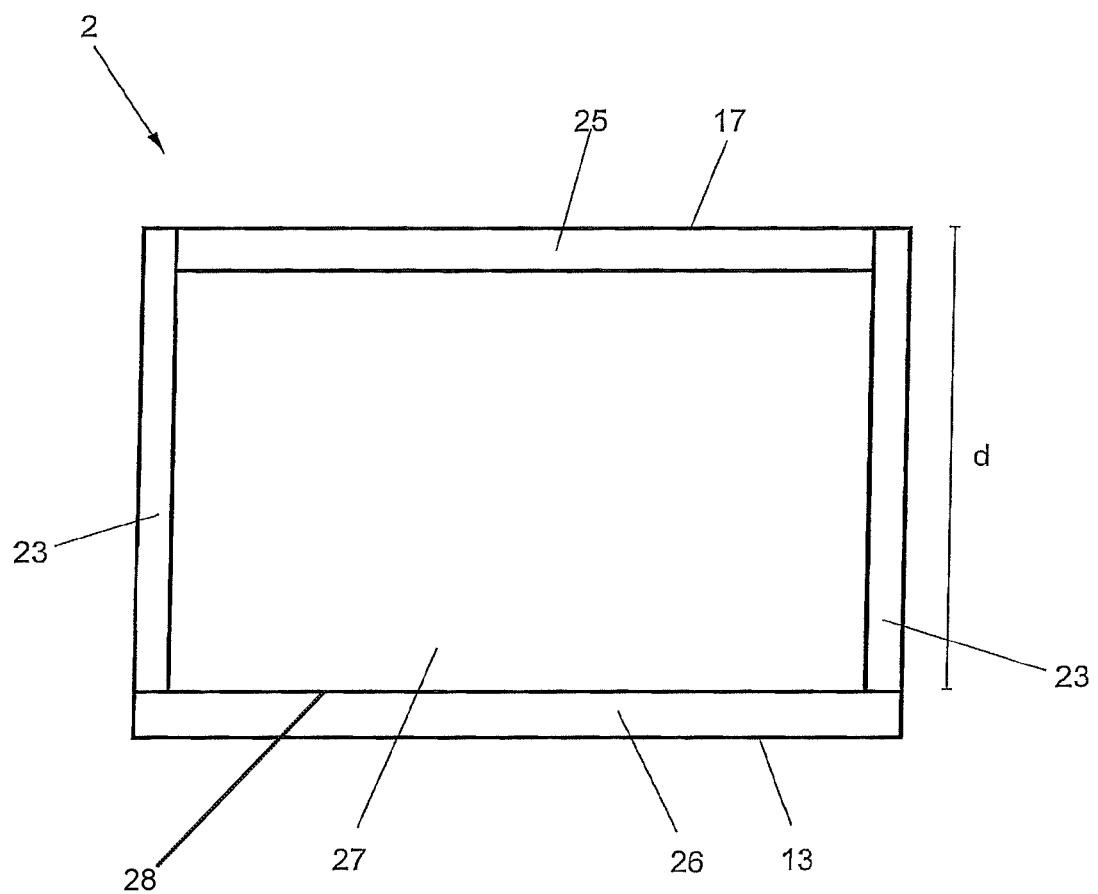
FIG. 9 depicts a preferred configuration of the material confining element.

A preferred structure of the tank bottom will now be described with reference to FIG. 9. The tank bottom 2 is preferably comprised of a prism. A portion of its base comprises the radiation entry surface 13, and a portion of the top surface comprises the radiation exit surface 17.

The radiation source is disposed below the tank bottom 2. The projection (i.e. radiation) enters the tank bottom 2 from below through the base 13 and, through the top surface 17, reaches the photopolymerizable, diffusely reflecting material 11 coating the top surface 17.

The tank bottom 2 is made up of several layers or areas, which, in a preferred manner, again are comprised of prisms whose base and top surfaces extend in parallel with those of the tank bottom. The tank bottom 2 and the material are incorporated in a frame such that, on the one hand, the material is prevented from flowing out and, on the other hand, the projection is able to enter the tank bottom 2 unimpeded.

Putty or oil is provided as connection material between the areas where an air gap would otherwise form.

The first, upper area 25 of the tank bottom 2 is comprised of a transparent material, or a composite of several materials, exhibiting elasticity and enabling the separation of the solidified material layer from the tank bottom 2. Depending on the configuration, said layer has a thickness ranging from a few 10 µm to some mm. The area is coated by photopolymerizable material 11.

The second area 27 is comprised of a transparent block, preferably of glass or polymethylmethacrylate, whose thickness d corresponds to half the diameter of the coated area of the top surface 17. Total internal reflection on the base 13 of the tank bottom 2 that is directly reflected back to the material will thus be prevented. The entry surface 13 of the radiation is part of the base of this area.

The surfaces of the tank bottom 2 are coated in the manner described below. The base 13 of the tank bottom 2 is provided with an antireflective layer 28 significantly attenuating the normally reflected light, usually to 0.5-1%. The lateral surface 18 of the tank bottom is absorptively coated (23) in order to prevent a total internal reflection on the lateral surface 18.

The invention claimed is:

1. A method for solidifying a photopolymerizable, diffusely reflecting material by irradiation, comprising:
   performing irradiation of a surface to be solidified through a transparent material confining element into the material, wherein the material coats the transparent material confining element; and
   adapting a) a thickness of the material confining element and b) at least one of a coated surface, a construction field, and a surface to be solidified of the material to one another such that the thickness of the material confining element is at least ¼ of a diameter of at least one of the coated surface, the construction field, and the surface to be solidified, respectively.

2. The method according to claim 1, wherein the thickness of the material confining element is at least ⅓ of the diameter of the at least one of the coated surface, the surface to be solidified, and the construction field, respectively.

3. The method according to claim 1, wherein the thickness of the material confining element is at least ½ of the diameter of the at least one of the coated surface, the surface to be solidified, and the construction field, respectively.

4. The method according to claim 1, wherein a smallest distance between the construction field and a radiation entry surface facing away from the coated surface is at least 10 mm.

5. The method according to claim 1, wherein a smallest distance between the construction field and a radiation entry surface facing away from the coated surface is at least 20 mm.

6. The method according to claim 1, wherein a smallest distance between the construction field and a radiation entry surface facing away from the coated surface is at least 30 mm.

7. The method according to claim 1, wherein the thickness of the material confining element and the coated surface are adapted to each other such that any radiation reflected from the material into the material confining element at the critical angle or more is totally internally reflected on side walls of the material confining element.

8. The method according to claim 1, wherein a surface except for radiation entry and exit surfaces of the material confining element are at least partially provided with radiation-absorbing properties.

9. The method according to claim 8, wherein side walls of the material confining element are at least partially provided with radiation-absorbing properties.

10. The method according to claim 8, wherein the radiation-absorbing properties are provided by a layer that absorbs radiation at least in certain areas.

11. The method according claim 1, wherein a surface of the material confining element is at least partially provided with antireflection properties.

12. The method according to claim 11, wherein the surface is a radiation entry surface facing away from the coated surface.

13. A method for the layered construction of a shaped body from a photopolymerizable, diffusely reflecting material, wherein:

shaped body layers are successively formed one above the other by respectively forming on a material confining element a material layer of predefined thickness of the photopolymerizable material;

a construction platform, or the shaped body at least partially built on the construction platform, is lowered into the material layer such that, between the construction platform, or the shaped body, and the material confining element a layer to be solidified of the material is formed, which is position-selectively solidified by irradiation through the material confining element to provide the desired shape of the shaped body layer; and solidification is carried out by a method according to claim 1.

14. A device for solidifying a photopolymerizable, diffusely reflecting material by irradiation, wherein:

a transparent material confining element, is coatable by the material and a radiation source is arranged below the material confining element for irradiating a surface to be solidified through the transparent material confining element; and the thickness of the material confining element and the coatable surface, are adapted to each other such that the thickness of the material confining element corresponds to at least ¼ of the diameter of the coatable surface.

15. The device according to claim 14, wherein the coatable surface is a construction field of the device.

16. The device according to claim 15, wherein the smallest distance between the construction field and a radiation entry surface facing away from the coatable surface is at least 10 mm.

17. The device according to claim 14, wherein the thickness of the material confining element and the coatable surface, are adapted to each other such that any radiation reflected from the material into the material confining element at the critical angle or more is totally internally reflected on side walls of the material confining element.

18. The device according to claim 14, wherein a surface except for the radiation entry and exit surfaces, of the material confining element are at least partially provided with radiation-absorbing properties.

19. The device according to claim 14, wherein a radiation entry surface of the material confining element facing away form the coatable surface is at least partially provided with antireflection properties.

20. The device according to claim 14, wherein the material confining element comprises an elastic layer forming the coatable surface.

21. The device according to claim 14, wherein the material confining element comprises a transparent block of glass or polymethylacrylate.

22. A method for solidifying a photopolymerizable, diffusely reflecting material by irradiation, comprising:

performing irradiation of a surface to be solidified through a transparent material confining element into the material, wherein the material coats the transparent material confining element; and adapting a) a thickness of the material confining element and b) a coated surface to one another such that the thickness of the material confining element is at least ¼ of a diameter of the coated surface.

23. A method for solidifying a photopolymerizable, diffusely reflecting material by irradiation, comprising:

performing irradiation of a surface to be solidified through a transparent material confining element into the material, wherein the material coats the transparent material confining element; and adapting a) a thickness of the material confining element and b) a construction field to one another such that the thickness of the material confining element is at least ¼ of a diameter of the construction field.

* * * * *